H. A. HOKE.
EQUALIZING ARRANGEMENT FOR LOCOMOTIVES.
APPLICATION FILED APR. 28, 1913.
1,082,592. Patented Dec. 30, 1913.
2 SHEETS—SHEET 1.
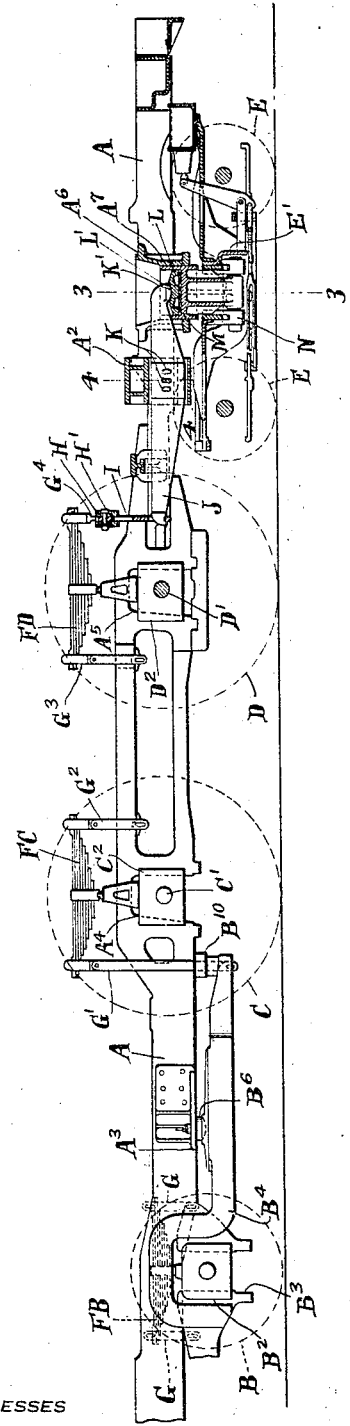
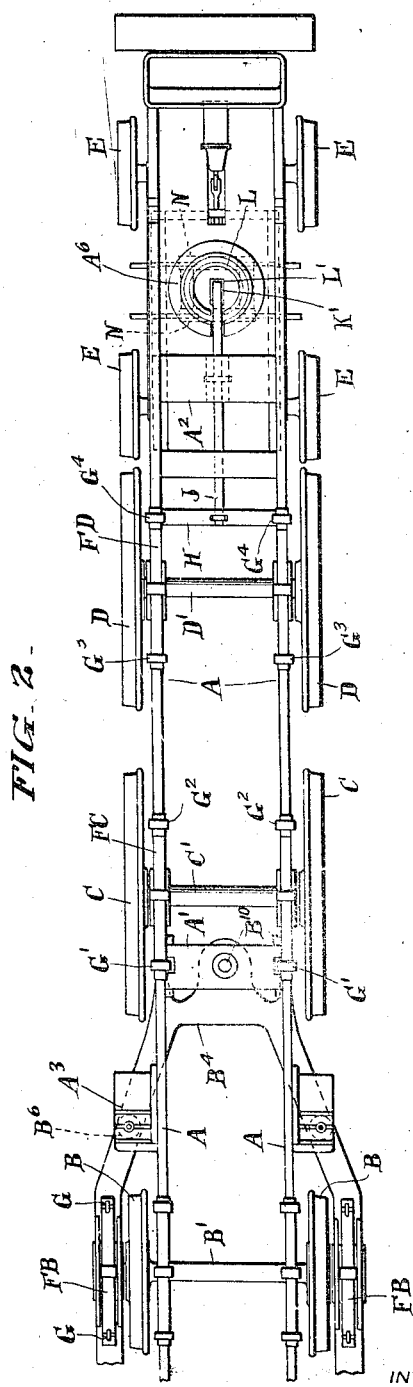

H. A. HOKE.
EQUALIZING ARRANGEMENT FOR LOCOMOTIVES.
APPLICATION FILED APR. 28, 1913.
1,082,592.
Patented Dec. 30, 1913.
2 SHEETS—SHEET 2.
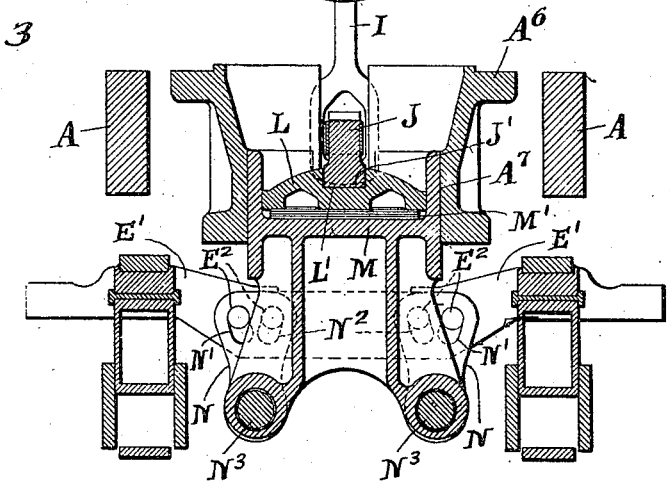
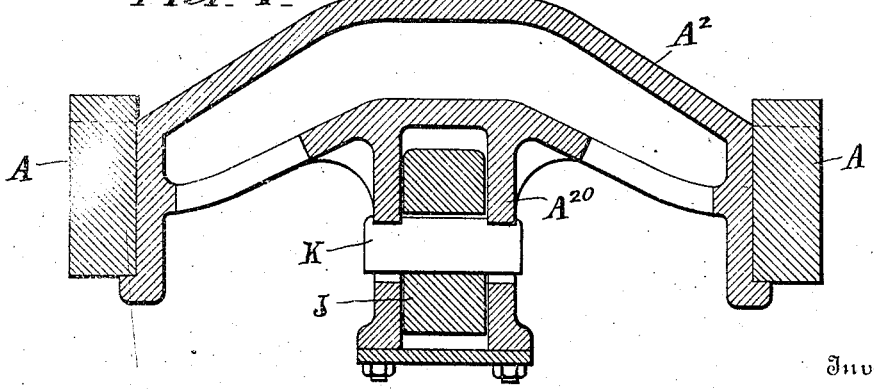

UNITED STATES PATENT OFFICE.

HARRY A. HOKE, OF ALTOONA, PENNSYLVANIA.

EQUALIZING ARRANGEMENT FOR LOCOMOTIVES.

1,082,592.

Specification of Letters Patent.

Patented Dec. 30, 1913.

Application filed April 28, 1913. Serial No. 763,960.

*To all whom it may concern:*

Be it known that I, HARRY A. HOKE, a citizen of the United States of America, residing in Altoona, in the county of Blair and State of Pennsylvania, have invented a certain new and useful Improvement in Equalizing Arrangements for Locomotives, of which the following is a true and exact description, reference being had to the accompanying drawings, which form a part thereof.

My present invention relates to locomotives of the type in which a four wheel leading truck is employed, and consists in a novel arrangement for connecting the frame of the leading truck of a locomotive to the engine frame proper devised with the object of securing a proper equalization of the portions of the weight of the locomotive transmitted to the leading truck and to the drivers, and trailing truck if employed, of the locomotive under varying conditions of operation.

Heretofore it has been the universal practice on a locomotive having a four-wheel leading truck to allow the leading truck to carry the weight of the front end of the locomotive directly on the leading truck center plate through an upper center plate which is cast as an integral part of the cylinder saddle or bolted thereto. The remaining part of the locomotive is carried by two equalization systems made up of levers, springs, etc., transmitting the load to the driving wheels and trailing truck wheels on each side of the locomotive. Thus the body of the locomotive is carried by a "three-point support" system of equalization. This arrangement has been found very satisfactory for locomotives having four wheel trucks and two pairs of drivers, but for a locomotive having a four wheel leading truck and two pairs of drivers and a trailing truck, or three pairs of drivers with or without a trailer truck, the center of gravity of the spring supported parts comes so far back that it is in rear of the center line of the first driver wheel, and the driving springs on a modern locomotive of this type are so heavy and stiff that they will, if the spring rigging on the locomotive is not in proper condition, carry a large percentage of the weight of the locomotive body which should be carried by the leading truck. As the guiding effect of the leading truck depends directly upon the weight carried by it, the improper reduction in the weight imposed upon the truck occasionally occurring as refererd to above sometimes results in derailing the truck.

The arrangement disclosed and claimed herein comprises satisfactory provisions for impressing its proper proportion of the weight of the locomotive upon the leading truck under all normal conditions of operation and thus eliminates one source of accident.

The various features of novelty which characterize my invention are pointed out with particularity in the claim annexed to and forming a part of this specification. For a better understanding of the invention, however, and of the advantages possessed by it, reference should be had to the accompanying drawings and descriptive matter in which I have illustr d and described forms in which my invention may be embodied.

Of the drawings: Figure 1 is a vertical, longitudinal and somewhat diagrammatic sectional elevation of so much of a locomotive structure as is necessary for an understanding of the present invention; Fig. 2 is a plan view of a portion of the locomotive; Fig. 3 is a transverse section taken on the line 3—3 of Fig. 1; and Fig. 4 is a partial transverse section taken on the line 4—4 of Fig. 1.

The locomotive partially shown in the drawings is one having a two wheel trailing truck, two pairs of drivers and a four wheel leading truck. The axle $B'$ connecting the trailing truck wheels $B$ is journaled in boxes $B^2$ which are vertically movable in guideways $B^3$ formed in a trailing truck frame $B^4$ which is pivotally connected at $B^{10}$ to a cross piece $A'$ connecting the side frames $A$ of the locomotive. The frame $B^4$ is connected by links $G$ in front and rear of each bearing box $B^2$ to the opposite ends of a corresponding trailing truck equalizing spring $FB$ which bears at its center against the subjacent bearing box $B^2$. Bearing blocks $B^6$ interposed between the frame $B^4$ and the under side of brackets $A^8$ secured one to the outer side of each side frame $A$, form fulcrums on which the frame $B^4$ may rock and are slidable along the under sides of the brackets $A^8$ to permit the necessary horizontal movement of the frame $B^4$ relative to the main frame of the locomotive about the pivotal connection $B^{10}$. At its front end the trailing truck frame B⁴ is connected at each side of the locomotive by a jointed link G' to the rear end of the corresponding rear driving spring FC. The springs FC bear at their centers against the bearing boxes C² in which is journaled the axle C' connecting the rear driver wheels C. The bearing boxes C² are vertically movable in guideways A⁴ formed in the side frames A of the locomotive. The front drivers D of the locomotive have their axle D' journaled in bearing boxes D² vertically movable in guideways A⁵ formed in the side frames A of the locomotive and the boxes D² bear against the centers of the front driving spring FD.

The locomotive, shown in so far as it has already been described in detail, possesses nothing novel with me, but on the contrary is of a type now in general use. With this type of locomotive construction it has long been the universal practice to link the front ends of the front driving springs FD directly to the side frames A of the locomotive, and to connect the front of each rear driving spring FC to the rear end of the front driving spring FD on the same side of the locomotive by a suitable equalizing connection. With the present invention, however, the front ends of the rear driving springs FC are connected to the locomotive side frames A by links G²; and the rear ends of the front driving springs FD are connected to the frames A by links G³, while the front ends of the springs FD are connected by suitable equalizing connections to the frame E' of the leading truck.

As shown, the front ends of the springs FD are connected by links G⁴ to a transverse equalizing bar H. The latter is connected at its center by the pin H' to the upper end of the link I. The link I is connected at its lower end to the rear end of an equalizing lever J which is fulcrumed against the cross piece A² of the locomotive frame. With this arrangement it will be understood without further explanation that the length of the lever arms formed by the portion of the lever J at the opposite side of the fulcrum pin can be varied by changing the location of the fulcrum K, thus varying the relative weights carried by the lever J at its front and rear ends. At its front end the lever J is provided with a rounded bearing surface J' which engages a bearing L' formed on a follower member L which is supported in turn by the center plate M of the leading truck. The lower center plate M is vertically movable and also angularly movable about a vertical axis in a guideway A⁷ provided for the purpose in the portion A⁶ of the locomotive frame.

M' represents washers which may be interposed between the bearing block L and the center plate M. In the preferred construction illustrated the center plate M has a swinging connection to the frame E' of the leading truck, although this swinging connection is not essential to the use of my invention.

The leading truck wheels E may be mounted in the frame E' in the usual manner. In the form shown the swinging connection comprises links N pivotally connected at their lower ends as by pins N³ to the center plate M and each formed at its upper end with the usual curved slots N' and N² receiving the pins E²- carried by the frame E' of the leading truck.

With the construction described the locomotive body has the desirable so called "three point support," the forward center support being formed by the equalizing arrangements by which the weight of the front end of the locomotive is transmitted to the front drivers and the leading truck. The two rear supports of the locomotive body are formed by the equalizing arrangements at each side of the locomotive by which the weight of the rear end of the locomotive is transmitted to the locomotive wheels—drivers or drivers and truck wheels—at the rear of the front drivers. This arrangement insures the proper distribution of the weight of the locomotive body among the various driver and truck wheels; and, in particular, insures that the proper portion of the weight of the locomotive is impressed upon the leading truck notwithstanding the fact that the center of gravity of the locomotive body may be appreciably back of the front drivers, and without interfering with a suitable connection between the truck and the locomotive frame to enable the truck to perform its usual guiding function.

While in accordance with the previsions of the statutes I have illustrated and described the best forms of my invention now known to me, it will be apparent to those skilled in the art that changes may be made in the form of the apparatus disclosed without departing from the spirit of my invention, and that under some conditions certain features of my invention may be used without a corresponding use of other features.

Having now described my invention, what I claim as new and desire to secure by Letters Patent is:

In a locomotive having a four wheel leading truck, a front pair of drivers, and a plurality of pairs of other track engaging wheels back of the front drivers, the combination with the frame of the locomotive, of means connecting said truck to said frame with freedom to move vertically with respect to said frame and to turn with respect thereto about a vertical axis passing centrally through the truck, said means comprising a truck center plate portion journaled in a bearing formed in said frame to turn therein about the vertical axis of said portion and vertically slidable in said bearing, a centrally disposed longitudinally extending lever fulcrumed between its ends against the engine frame and having its front end bearing on said center plate, front driving springs connected at their front ends to the rear end of said lever and connected at their rear ends to the locomotive frame, and other equalizing means for distributing the portion of the weight of the locomotive sustained by said other locomotive wheels among the latter.

HARRY A. HOKE.

Witnesses:
   J. L. WERTZBERGER,
   J. T. HANLON.